Figure 1:
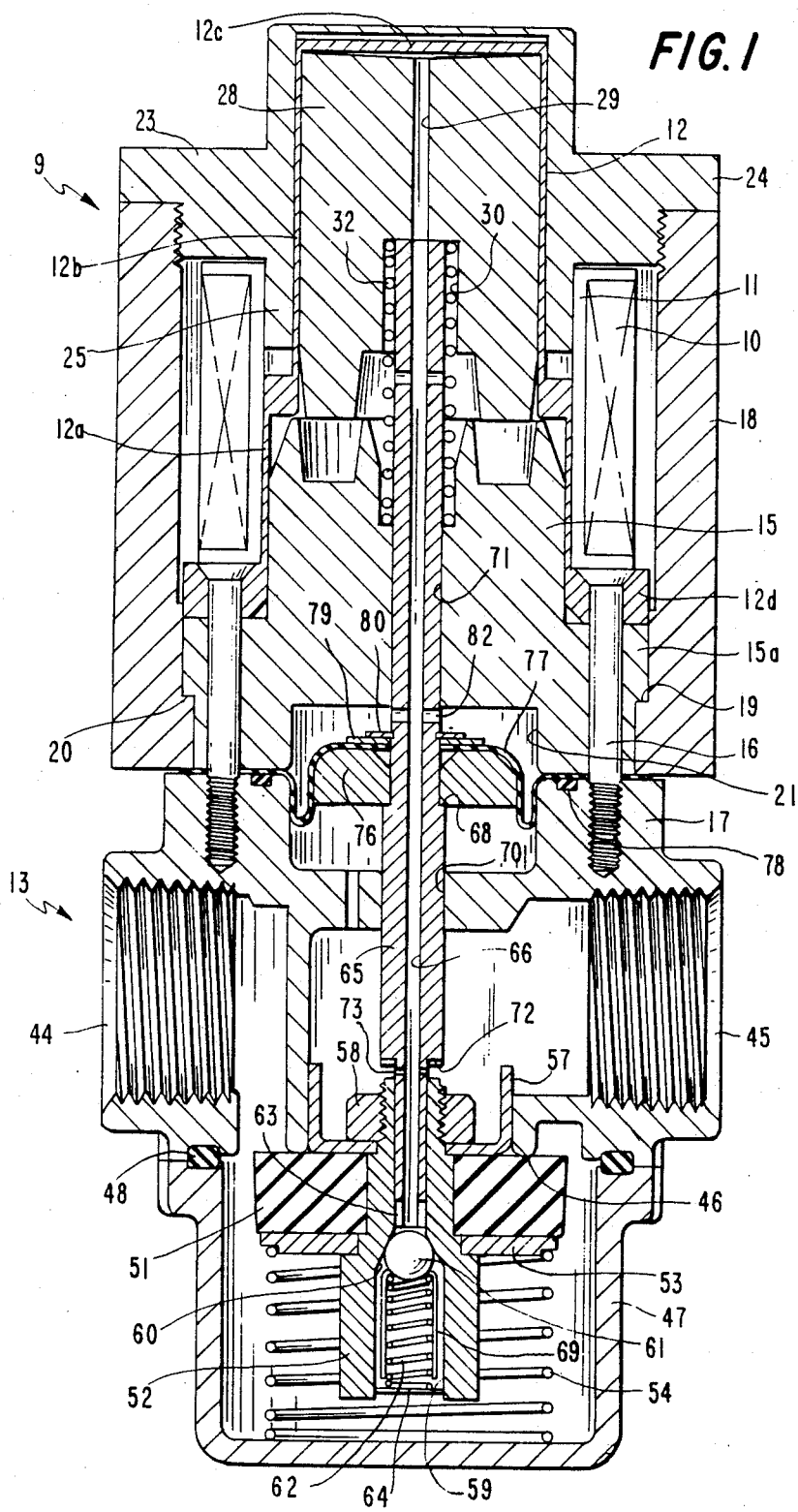

United States Patent [19]

LaMarca

[11] Patent Number: 4,921,208
[45] Date of Patent: May 1, 1990

[54] PROPORTIONAL FLOW VALVE

[75] Inventor: Drew P. LaMarca, Whippany, N.J.

[73] Assignee: Automatic Switch Company, Florham Park, N.J.

[21] Appl. No.: 404,945

[22] Filed: Sep. 8, 1989

[51] Int. Cl.⁵ ............................................. F16K 31/04
[52] U.S. Cl. .................................. 251/30.04; 251/39; 251/46
[58] Field of Search ............... 251/30.02, 30.03, 30.04, 251/38, 39, 45, 46

[56] References Cited

U.S. PATENT DOCUMENTS

| | | | |
|---|---|---|---|
| 1,394,895 | 10/1921 | Griffin | 251/39 |
| 1,505,032 | 8/1924 | Klein | 251/30.04 |
| 1,658,000 | 1/1928 | Langdon | 251/39 |
| 1,892,565 | 12/1932 | Browne | 251/39 |
| 1,894,267 | 1/1933 | Foresman | 251/39 |
| 2,554,158 | 5/1951 | Spence | 251/39 |
| 2,624,542 | 1/1953 | Ghormley | 251/30.02 |
| 3,667,722 | 6/1972 | Katz et al. | 251/38 |
| 4,311,296 | 1/1982 | Scheffel | 251/38 |
| 4,746,093 | 5/1988 | Scanderbeg | 251/38 |
| 4,776,561 | 10/1988 | Braunlich et al. | 251/39 |

FOREIGN PATENT DOCUMENTS

| | | | |
|---|---|---|---|
| 349272 | 3/1905 | France | 251/39 |
| 7105 | 3/1896 | Sweden | 251/39 |
| 13858 | of 1888 | United Kingdom | 251/39 |

Primary Examiner—George L. Walton
Attorney, Agent, or Firm—Alan H. Levine

[57] ABSTRACT

A proportional flow valve wherein inlet fluid pressure urges the valve member toward the valve set. A pressure member, which may be a rolling diaphragm, has an effective area about equal to that of the valve orifice and is also subjected to inlet fluid pressure, when the valve is open, to counterbalance the force of the inlet fluid pressure on the valve member. A spring constantly urges the valve member toward the valve seat, to close the valve, and a solenoid actuator, when energized, moves the valve member way from the valve seat against the force of the spring. The distance which the valve member moves from the seat, and hence the rate of flow through the valve, is proportional to the amount of current applied to the solenoid actuator. A pilot valve controls the flow of inlet fluid pressure to the pressure member.

11 Claims, 4 Drawing Sheets

PROPORTIONAL FLOW VALVE

This invention relates to a valve operated by an electrical solenoid actuator, and more particularly to a proportional flow valve of this type.

A proportional flow valve is one which permits a rate of fluid flow through the valve proportional to the amount of electric current applied to the solenoid of the actuator controlling the valve. In this type of arrangement, the actuator behaves in a linear manner, i.e., the force produced by the solenoid armature is linearly proportional to the current applied to the solenoid. As a result, the solenoid armature works in linear manner against the closing spring which constantly urges the valve member toward the valve seat. In this way, the distance which the valve member is moved away from the valve seat is proportional to the amount of current applied to the solenoid.

Proportional flow valves find utility in performing mixing and measurement functions. For example, proportional valves are used to accurately blend different gasolines to achieve desired characteristics, such as particular octane ratings. Also, a proportional valve may be used to open a valve gradually so that the flow of the controlled fluid, such as natural gas, begins slowly after which the valve may be fully opened.

Typically, the power applied to the solenoid actuator is a rapidly pulsed DC current, the amount of current varying with the length of "on" and "off" times of the pulses.

It is an object of the invention to provide a proportional flow valve wherein a pressure member is subjected to inlet fluid pressure to counterbalance the effect of inlet fluid pressure tending to close the valve; the solenoid actuator then works against the valve closing spring to adjust the position of the valve member and hence the rate of flow through the valve.

It is another object of the invention to provide a failsafe proportional flow valve, wherein in the event of failure of the solenoid actuator and even of the valve closing spring, the valve will be closed by the inlet fluid pressure.

It is a further object of the invention to provide such a valve including a pilot valve for controlling the flow of fluid from the inlet port for pressurizing the pressure member.

It is an additional object of the invention to provide such a valve wherein a single hollow stem serves (1) to transmit movement of the solenoid armature to open both the pilot and main valves, (2) to transmit movement of the pressure member to the main valve, and (3) to provide a passageway through which high pressure fluid flows from the valve inlet port to the pressure member.

Other features and advantages of the invention will be apparent from the following description, in which reference is made to the accompanying drawings.

Figure 2:
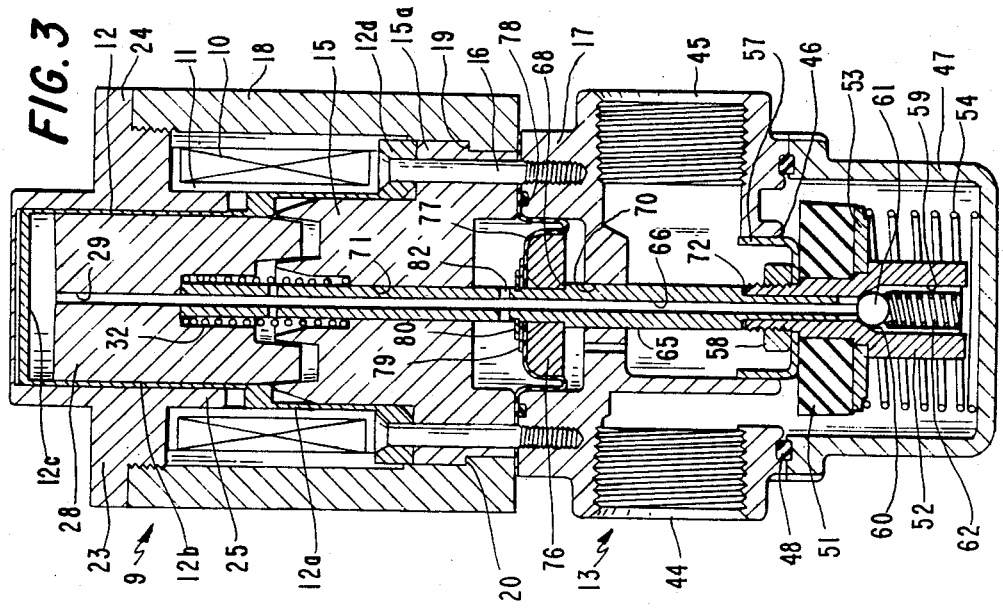
Figure 3:
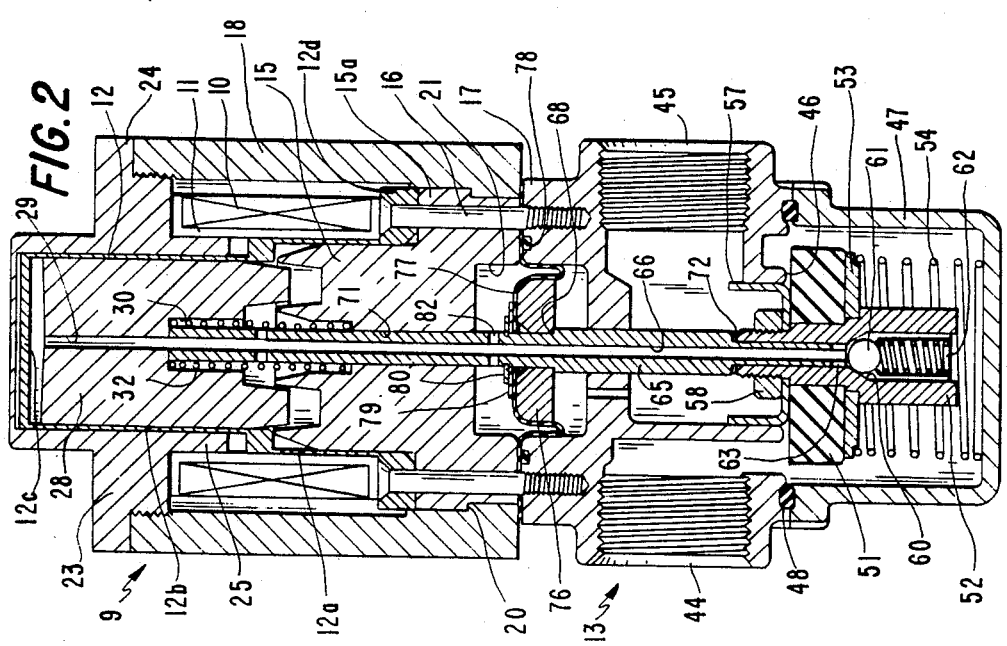
Figure 4:
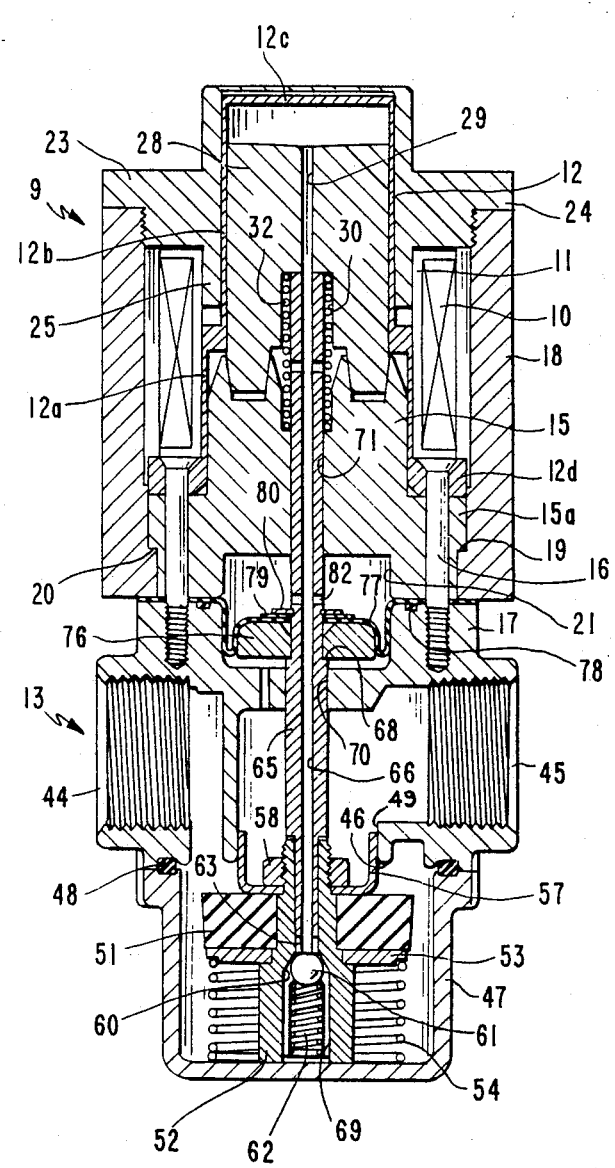
Figure 5:
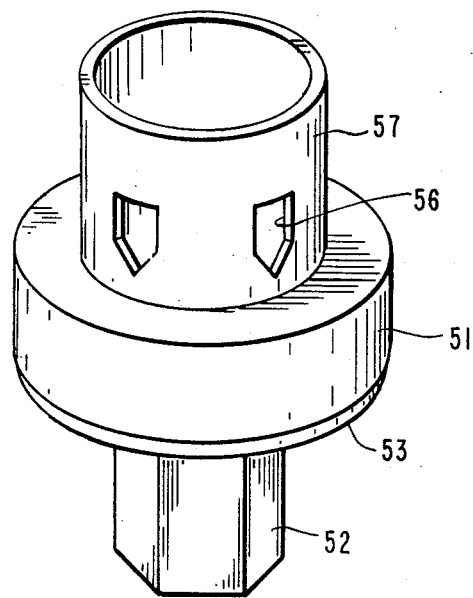
Figure 6:
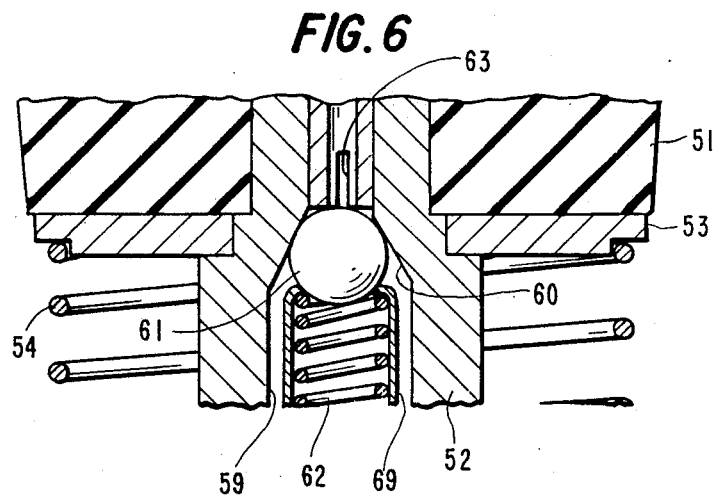

In the drawings:

FIG. 1 is a cross-sectional view of a proportional flow valve according to the present invention, the solenoid actuator being deenergized and the valve closed;

FIGS. 2, 3, and 4 are views similar to FIG. 1, showing the valve progressively more open to permit greater rates of flow through the valve;

FIG. 5 is a perspective view, on an enlarged scale, of the main valve member assembly: and FIG. 6 is a fragmentary cross-sectional view, on an enlarged scale, of a portion of the main valve member assembly.

Referring to FIG. 1, the proportional flow valve 13 chosen to illustrate the present invention includes a valve body having a fluid inlet port 44, a fluid outlet port 45, and a main valve seat between those ports surrounding a main orifice 49 (FIG. 4). A bonnet 47 is secured to valve body 17 by suitable fasteners (not shown), a seal 48 insuring a fluid-tight connection between the bonnet and valve body.

Surmounting valve body 17 is a solenoid actuator 9. The actuator includes a coil of electrically conductive wire 10 wound upon a spool 11 made of non-electrically and non-magnetically conductive material. Suitable terminals (not shown) are provided for connection to a source of electric current for energizing the coil.

A core tube 12 of non-magnetic material is located within coil 10 and spool 11. Between its ends, core tube 12 is provided with a stepped configuration, so that its lower portion 12a fits snugly within spool 11, and its upper portion 12b is spaced radially inward from the spool. The upper portion 12b of the core tube extends upwardly beyond the coil 10 and is closed at its upper end by a top wall 12c. The lower end of core tube 12 terminates in an outwardly projecting flange 12d. All the parts of core tube 12, identified by the reference numerals 12a–d, are preferably formed of a single piece of material, such as suitable non-magnetic metal.

Within the lower portion 12a of core tube 12 is a stationary armature or plugnut 15 of magnetic material. The lower end of the plugnut presents an outwardly projecting flange 15a which underlies flange 12d of core tube 12. Bolts 16 pass through holes in flanges 12d and 15a to secure together the core tube and plugnut, the bolts being threaded into the body 17 of the valve 13. The lower face of plugnut 15 and upper face of valve body 17 are shaped so that together they define between them a chamber 21.

A cylindrical yoke 18 of magnetic material surrounds coil 10 and the flanges 12d and 15a. At this lower end, yoke 18 is formed with and inwardly directed shoulder 19 which fits beneath an undercut 20 formed in the surface of flange 15a of plugnut 15. As a result, shoulder 19 is captured between undercut 20 and the upper surface of valve body 17, so that bolts 16 serve to secure yoke 18 to the plugnut and valve body.

At its upper end, yoke 18 is internally threaded for cooperation with the external threads presented by a cap or flux sleeve 23 made of magnetic material. Directly above its threaded portion, cap 23 is formed with an outwardly projecting flange 24 which engages the upper edge of yoke 18. Depending from the threaded portion of cap 23 is a collar 25 accommodated within the space between spool 11 and the upper portion 12b of core tube 12. Above the level of flange 24, the cap is shaped to completely surround the upper end of core tube 12. It will be appreciated that plugnut 15, yoke 18, and cap 23 form a magnetic circuit surrounding coil 10.

Axially slidable within the upper portion 12b of core tube 12 is a movable armature 28 of magnetic material. Armature 28 is formed with an axial hole 29 extending from the upper face of armature 28 to an enlarged bore 30 near the lower end of armature 28. Plugnut 15 is formed in its upper portion with a corresponding enlarged bore 31. A compression spring 32, seated within bores 30 and 31, constantly urges movable armature 28 upwardly away from plugnut 15. Thus, when coil 10 is deenergized spring 32 maintains armature 28 against the top wall 12c of core tube 12 (FIG. 1).

Any suitable linear solenoid actuator will serve the purpose of the present invention. The particular actuator described above is set forth in more detail in a copending application filed on the same date as this application by the same inventor, and entitled "Solenoid Actuator".

Referring to valve 13, a main valve member 51, of flexible material, is movable in an axial direction toward and away from valve seat 46. Valve member 51 is carried by a nipple 52 (FIGS. 5 and 6) and furnished with a back-up washer 53 against which a closing spring 54 presses to urge valve member 51 toward seat 46. Thus, when coil 10 is deenergized, spring 54 presses main valve member 51 against main valve seat 46 to close the valve.

Arranged against the face of valve member 51, opposite washer 53, is a cup-like guide 57 secured in place by a nut 58 threaded on to the upper end of nipple 52. Guide 57 is perforated with openings 56 (FIG. 5) so that when valve member 51 is moved away from valve seat 46, fluid can flow from inlet 44 through the holes 56 in guide 57 to outlet port 45.

Nipple 52 is formed with an axial bore 59 (FIGS. 1 and 6) which is of relatively large diameter in the lower region of the nipple and relatively small diameter in the upper portion of the nipple. Between the larger and smaller diameter portions of the bore, the latter is tapered outwardly and downwardly to define a pilot valve seat 60. A pilot valve member, in the form of a resilient ball 61, is urged against seat 50 by a pilot closing spring 62. The lower end of spring 62 seats against a ring 64 fixed in the lower end of bore 59, the ring being open to permit fluid flow through it. A sleeve 69 (FIGS. 1 and 6) surrounds spring 62 and is crimped at its upper end to engage the upper end of spring 62 and prevent the upper end of the spring from digging into and possible damaging pilot valve member 61.

Axially slidable within the upper portion of bore 59, in nipple 52, is the lower end of a rigid tube 65 having a continuous longitudinal bore 66. The bottom of tube 54 is formed with several short longitudinal slots 63 (FIGS. 1 and 6). Above nipple 52, tube 65 has an enlarged external diameter to provide a downwardly facing shoulder 67 and an upwardly facing shoulder 68, the tube having a slightly smaller external diameter above shoulder 68. Tube 65 extends slidably through a hole 70 in valve body 17 and an axial hole 71 in plugnut 15 and into bore 30 of armature 28, the upper end of tube 64 seating against the top wall of bore 30. Spring 32 surrounds the upper portion of tube 65.

When solenoid actuator 9 is deenergized (FIG. 1), shoulder 67 of tube 65 is spaced above the upper end of nipple 52. An O-ring seal 72 surrounds the small diameter portion of tube 65 and engages shoulder 67. Between seal 72 and nipple 52, tube 65 is furnished with a lateral vent hole 73 through which the internal passageway 66 of the tube can communicate with outlet port 45.

Seated on upwardly facing shoulder 68 of tube 65, within chamber 21, is a disk-like support 76 over which is draped a rolling diaphragm 77. The diaphragm may be of any suitable rubber-like material, but preferably is a polyester-reinforced rolling diaphragm available from Bellofram Corp. of Burlington, Massachusetts.

The central portion of diaphragm 77 rests upon support 76, and the annular margin of the diaphragm is sandwiched between body 17 and plugnut 15, the margin together with an O-ring 78 serving to provide a fluid-tight seal between the valve body and the plugnut. The region of diaphragm 77 between its central portion and margin is rolled or folded within the annular space between the peripheral edge of support 76 and the wall of chamber 21. A washer 79 surrounds tube 65 immediately above diaphragm 77 and a snap ring 80 seats in an annular groove formed in the tube. Cooperation of the snap ring and shoulder 68 serves to fix support 76 and the central portion of diaphragm 77 to tube 65 so that the latter move with the tube.

Above snap ring 80, tube 65 is furnished with a lateral hole 82 through which the internal passageway 66 of the tube can communicate with the region of chamber 21 above diaphragm 77, i.e., the region of chamber 21 exposed to the side of the diaphragm opposite the side facing main valve member 51. The flow area of hole 82 is much larger than the flow area hole 73 in the tube.

In FIG. 1, valve 13 is closed, i.e., main valve member 51 engages main valve seat 46, and coil 10 is deenergized. When the coil is energized, armature 28 begins moving toward plugnut 15 and in so doing slides tube 65 downwardly. During this initial movement, i.e., before shoulder 67 (or more correctly seal 72) engages the upper end of nipple 52, the lower end of tube 65 engages pilot valve member 61, thereby moving that member away from pilot valve seat 60 so as to open the pilot valve.

When the pilot valve opens (FIG. 2), high pressure fluid from inlet port 44 flows through the pilot valve into passageway 66 in tube 65. Slots 63 in the lower end of the tube insure that fluid flows into the passageway even though member 61 may plug the end of the tube. The fluid flows from passageway 66 through holes 82 into the region of chamber 21 above diaphragm 77, thereby pressurizing the diaphragm.

The area of diaphragm 77 subjected to the high pressure fluid is about equal to the area of main valve orifice 49, so that the downward force on the diaphragm caused by the fluid pressure in chamber 21 equals and counterbalances the net upward force caused by fluid pressure of main valve member 51. As diaphragm 77 moves axially with tube 65, it rolls between support 76 and the wall of chamber 21. In this way, the diaphragm is not stretched, and its surface area exposed to high pressure fluid always remains the same.

Upon further downward movement of tube 65, as a result of continued downward movement of armature 28, shoulder 67 engages the upper end of nipple 52, at which point main valve member 51 is moved away from main valve seat 46 to open the valve (FIG. 3) and permit flow of fluid from inlet port 44, through orifice 49, to outlet port 45. Further downward movement of armature 28 causes valve member 51 to move further away from valve seat 46 (FIG. 4), thereby further increasing the rate of fluid flow through the valve. The arrangement is such that armature 28 works against valve closing spring 54 and spring 32 so that as more current is supplied to coil 10, armature 28 moves closer to plugnut 15, as a result of which valve member 51 is moved away from valve seat 46 in proportion to the amount of current supplied to coil 10.

More specifically, coil 10 is preferably energized using a pulse width modulation technique. According to this technique, DC voltage applied to coil 10 is turned on and off at a very rapid rate, e.g., 200 to 400 Hz. By varying the "on" and "off" times of the voltage, the power applied to the solenoid can be varied almost infinitely from zero the full power.

Although the voltage is being turned on and off, the current flowing though the coil remains relatively steady due to the inductance of the coil which prevents the current from instantly following the voltage from zero to maximum. Instead, the current remains proportional to the average of the on time of the voltage. Thus, if the voltage is turned on 50% of the time and off 50% of the time, the current flowing through the coil will be at 50% of maximum. If the voltage switching is changed so that the voltage is turned on 75% of the time and off 25% of the time, the current flowing though the coil will be 75% of maximum.

In the present example, valve closing spring 54 is designed to balance the force exerted on armature 28 when coil 10 is energized. As a result, the percentage of valve opening will correspond to the percentage of "on" time of the voltage applied to coil 10. In this way, the flow permitted through the valve, from inlet port 44 to outlet port 45, will be roughly proportional to the "on" time of the solenoid. For example, if the "on" time of the voltage applied to coil 10 is 33%, armature 28 will move to one third of its maximum stroke from its position in FIG. 1 to that shown in FIG. 2. At the same time, main valve member 51 will move to about one third of its maximum stroke, against the force of spring 54, to permit about one third of its maximum fluid flow through the valve. If the "on" time of voltage applied to coil lo is increased to 66%, armature 8 will move to about two-thirds of its stroke (FIG. 3) thereby moving valve member 51 about two-thirds of its maximum distance from valve seat 46, permitting about two-thirds of maximum flow through the main valve.

When coil 10 is deenergized, spring 32 returns armature 28 upwardly to its starting position in engagement with wall 12c (FIG. 1). Closing spring 54 returns valve member 51 to its position engaging valve seat 46, and spring 62 returns pilot valve member 51 to this position engaging pilot valve seat 60. When shoulder 67 moves away from the upper end of nipple 52, hole 73 is exposed permitting the high pressure fluid in chamber 21 to flow out through hole 82, passageway 66, and hole 73 to outlet port 45. This quick release of pressure above diaphragm 77 aids in rapid closing of the valve. During initial downward movement of tube 65, hole 73 moves into nipple 52 and O-ring 72 seals against the upper end of the nipple to prevent high pressure fluid flowing through passageway 66 from flowing to outlet port 45 through hole 73.

The invention has been shown and described in preferred form only, and by way of example, and many variations may be made in the invention which will still be comprised within its spirit. It is understood, therefore, that the invention is not limited to any specific form or embodiment except in so far as such limitations are included in the appended claims.

I claim:

1. A proportional flow valve comprising:
   a valve body including an inlet port, an outlet port, and a valve seal between the ports, the valve seal surrounding an orifice,
   a valve member movable into and out of engagement with the valve seat to close and open the valve, respectively, the pressure of fluid from the inlet port urging the valve member into engagement with the valve seat when the valve is closed,
   a pressure member movable with respect to the valve seat,
   means for rigidly interconnecting the pressure member and the valve member,
   passageway means through which high pressure fluid from the inlet port can flow to the pressure member, so as to counterbalance the high pressure fluid acting on the valve member, the pressure member thereby opposing the force of fluid pressure from the inlet port tending to close the valve,
   support means within the valve body for slidably receiving said passageway means,
   vent means carried by the passageway means through which the passageway means can communicate with the outlet port, the vent means moving into the support means to close the vent means when the pilot valve is opened, to permit pressurizing of the pressure member, so as to establish the counterbalancing between the pressure member and the valve member, and the vent means moving out of said support means to open the vent means when the pilot valve is closed, so as to depressurize the pressure member,
   resilient means constantly urging the valve member toward the valve seat, and
   a solenoid actuator for moving the passageway means to move the valve member out of engagement with the valve seat against the force of the resilient means, the distance which the valve member moves from the seat being proportional to the amount of current applied to the actuator.

2. A valve as defined in claim 1 wherein the area of the pressure member subjected to fluid pressure from the inlet port is about equal to the area of the orifice surrounded by the valve seat, so that when the pressure member is pressurized the pressure member substantially counterbalances the force of the inlet fluid pressure on the valve member.

3. A valve as defined in claim 1 wherein the pressure member is a rolling diaphragm.

4. A valve as defined in claim 1 wherein the means for transmitting movement of the pressure member to the valve member is a rigid element slidable with respect to the valve body, the pressure member being fixed to the element.

5. A valve as defined in claim 1 including means responsive to energization of the solenoid actuator for opening the pilot valve to permit flow fluid from the inlet port to the pressure member.

6. A valve as defined in claim 5 wherein the solenoid actuator includes a movable armature, a rigid tube slidable with respect to the valve body, the interior of the tube defining the passageway through which fluid flows from the inlet port to the pressure member, the tube being responsive to the initial movement of the armature, upon energization of the solenoid actuator, for opening the pilot valve, further movement of the armature being transmitted by the tube to the valve member.

7. A valve as defined in claim 6 wherein the pressure member is mounted on and movable with the tube, the pressure member being spaced from the valve member along the length of the tube, and a lateral hole in the tube, on the side of the pressure member opposite the side facing the valve member, through which high pressure fluid flows out of the tube to pressurize the pressure member.

8. A valve as defined in claim 7 wherein the vent means includes a second lateral hole in the tube between the pressure member and the valve member through which the interior of the tube communicates with the outlet port, and means for closing the second lateral hole in response to the initial energization of the solenoid actuator.

9. A valve as defined in claim 6 including a hollow nipple which carries the valve member, the pilot valve including a pilot valve seat formed within the nipple and a pilot valve member movable into and out of engagement with the pilot valve seat to close and open the pilot valve, respectively, the end of the stem opposite the armature being slidable within the nipple and moving the pilot valve member out of engagement with the pilot valve seat in response to the initial movement of the armature upon energization of the solenoid actuator.

10. A valve as defined in claim 9 including a shoulder on the tube facing the valve member, the shoulder being spaced from the nipple when the solenoid actuator is deenergized, and the shoulder engaging the nipple after the initial movement of the solenoid armature, so that further movement of the armature is transmitted to the valve member.

11. A valve as defined in claim 10 wherein the pressure member is mounted on and movable with the tube, a lateral hole in the tube, on the side of the pressure member opposite the side facing the valve member, through which the interior of the tube communicates with the side of the pressure member opposite the side facing the valve member, and the vent means includes a second lateral hole in the tube, between the shoulder and the nipple, through which the interior of the tube communicates with the outlet port, the second lateral hole moving into the hollow nipple during the initial movement of the armature upon energization of the solenoid actuator.

* * * * *